United States Patent
Kampeas et al.

(10) Patent No.: US 11,625,925 B2
(45) Date of Patent: Apr. 11, 2023

(54) REMOTE SEGMENTATION UNDER LIMITED COMPUTATIONAL RESOURCES AND RATE CONSTRAINTS

(71) Applicant: GM GLOBAL TECHNOLOGY OPERATIONS LLC, Detroit, MI (US)

(72) Inventors: Joseph Kampeas, Ramat-Gan (IL); Ronit Bustin, Kfar Saba (IL); Eran Kishon, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 17/141,527

(22) Filed: Jan. 5, 2021

(65) Prior Publication Data
US 2022/0215199 A1 Jul. 7, 2022

(51) Int. Cl.
| | | |
|---|---|---|
| *G06V 10/42* | (2022.01) | |
| *G06V 10/75* | (2022.01) | |
| *G06V 20/56* | (2022.01) | |
| *H04W 4/44* | (2018.01) | |
| *G06N 3/08* | (2023.01) | |
| *H04W 4/46* | (2018.01) | |
| *G06K 9/62* | (2022.01) | |

(52) U.S. Cl.
CPC .......... *G06V 20/56* (2022.01); *G06K 9/6259* (2013.01); *G06N 3/08* (2013.01); *G06V 10/421* (2022.01); *G06V 10/751* (2022.01); *H04W 4/44* (2018.02); *H04W 4/46* (2018.02)

(58) Field of Classification Search
None
See application file for complete search history.

(56) References Cited

U.S. PATENT DOCUMENTS

| | | | |
|---|---|---|---|
| 2019/0035101 A1* | 1/2019 | Kwant | G06V 20/588 |
| 2019/0050648 A1* | 2/2019 | Stojanovic | G06V 20/13 |
| 2019/0138826 A1* | 5/2019 | Ghafarianzadeh | G06V 10/764 |
| 2020/0349722 A1* | 11/2020 | Schmid | G06N 3/0481 |
| 2021/0118153 A1* | 4/2021 | Schmid | G06T 7/269 |
| 2021/0311618 A1* | 10/2021 | Barton | G06F 3/0482 |

(Continued)

OTHER PUBLICATIONS

Bansai et al., "Pixelnet: Representation of the pixels, by the pixels, and for the pixels" arXiv preprint arXiv:1702.06506 (Feb. 2017) [17 pages].

(Continued)

*Primary Examiner* — Idowu O Osifade
(74) *Attorney, Agent, or Firm* — Cantor Colburn LLP

(57) ABSTRACT

A vehicle communication and control system includes a first vehicle in signal communication with a remote computing system and/or a second vehicle. The first vehicle includes a sensor configured to capture a raw image having a first image volume and including at least one target object. An image encoder included in the vehicle converts the raw image into a masked image having a second image volume that is less than the first image volume. A segmentation unit included in the remote computing system and/or the second vehicle determines the at least one target object from the masked image, generates a masked segmented image including a sparse segmentation of the at least one target object, and converts the sparse segmentation of the at least one target object into at least one recovered segmented target object indicative of the at least one target object.

20 Claims, 4 Drawing Sheets

(56) References Cited

U.S. PATENT DOCUMENTS

2021/0357670 A1* 11/2021 Wu .................. G06V 20/58
2022/0058332 A1*  2/2022 Ke .................... G06F 40/40
2022/0122267 A1*  4/2022 Sheshkus ............ G06T 7/12

OTHER PUBLICATIONS

Blau et al., "Rethinking lossy compression: The rate-distortion-perception tradeoff" arXiv preprint arXiv:1901.07821 (Jul. 2019) [21 pages].
Krahmer et al., "Total variation minimization in compressed sensing" InCompressed Sensing and its Applications (Nov. 2017) [23 pages].
Raguet et al., "Generalized forward-backward splitting" SIAM Journal on Imaging Sciences, (Jan. 2012) [29 pages].
Uhrig et al., "Sparsity invariant CNNs" In2017 international conference on 3D Vision (3DV) (Sep. 1, 2017) IEEE [16 pages].

* cited by examiner

REMOTE SEGMENTATION UNDER LIMITED COMPUTATIONAL RESOURCES AND RATE CONSTRAINTS

INTRODUCTION

The subject disclosure relates to digital image processing, and more particular, to a vehicle image segmentation system.

Modern vehicles are gathering and processing an ever-increasing amount of data. On the other hand, vehicles have limited viewpoints of their surroundings. Sharing of information between vehicles and/or other systems such as infrastructure or municipal transportation information servers can enhance their understanding of the surroundings and increase the performance of such systems. There are two main approaches to facilitate sharing of information. The first approach referred to as "the direct approach" involves a vehicle/infrastructure or other source of information that communicates the information to the interested party, meaning another vehicle. This approach is usually denoted as V2V or V2I. The second approach referred to as the "indirect approach" involves gathering the information in a cloud or edge computing system, where it is processed before being disseminated to the interested vehicles. This approach is usually denoted as V2N since the information is delivered from the vehicle to the network. In both cases, since the information shared is used to control and coordinate vehicle operation, the information must be processed quickly and the processed results must be shared and exchanged with low latency.

The information exchanged using V2V, V2I and/or V2N typically includes image data. One approach to processing image data for the use of vehicle control is the implementation of image segmentation systems in the vehicle. Image segmentation is the process of generating a high-resolution raw image into a low-volume segmented image. The raw image includes various types of target objects (e.g., pedestrians, vehicles, streets, etc.) present in the vehicle's surrounding environment. The resulting segmented image includes one or more segments that collectively represent the raw image, including the target objects. Accordingly, the vehicle's computing system can identify the boundaries from the segmented objects to determine the target objects included in the raw image data and can make driving decisions based on the locations and/or types of identified target objects.

SUMMARY

According to a non-limiting embodiment, a vehicle communication and control system comprises a first vehicle in signal communication with one or both of a remote computing system and a second vehicle. The first vehicle includes a sensor configured to capture a raw image having a first image volume and including at least one target object. An image encoder is included in the first vehicle and is configured to convert the raw image into a masked image having a second image volume that is less than the first image volume. A segmentation unit is included in one or both of the remote computing system and the second vehicle. The segmentation unit is configured to determine the at least one target object from the masked image, to generate a masked segmented image including a sparse segmentation of the at least one target object, and to convert the sparse segmentation of the at least one target object into at least one recovered segmented target object indicative of the at least one target object.

The system further includes a feature, wherein the segmentation unit comprises a convolution neural network (CNN) and an image decoder. The CNN is configured to generate the sparse segmentation of the at least one target object by applying a label to pixels associated with the at least one target object and excluding pixels disassociated with the at least one target object. The image decoder is configured to generate the at least one recovered segmented target object based on the label applied to the pixels.

The system further includes a feature, wherein the image encoder generates the masked image according to a random pixel mask and the image decoder generates the recovered segmented target object according to the random pixel mask.

The system further includes a feature, wherein the at least one recovered segmented target object is an approximation of the at least one target object included in the raw image.

The system further includes a feature, wherein the at least one target object includes a first type of target object and a second type of target object different from the first type of target object, and wherein the CNN applies a first label to pixels associated with the first type of target object and applies a second label to pixels associated with the second type of target object different from the first label.

The system further includes a feature, wherein the image decoder prioritizes decoding of the pixels associated with the first label over the pixels associated with the different second label.

The system further includes a feature, wherein the image decoder applies a matrix completion algorithm to the sparse segmentation of the at least one target object to generate the recovered segmented target object.

According to another non-limiting embodiment, a remote image segmentation system comprises an image encoder, a convolution neural network (CNN), and an image decoder. The image encoder is included on a vehicle and is configured to receive a raw image having a first image volume and including at least one target object, and to generate a masked image having a second image volume that is less than the first image volume. The CNN is located remotely from the image encoder. The CNN is configured to determine the at least one target object from the masked image and to generate a masked segmented image including a sparse segmentation of the at least one target object. The image decoder is remotely located from the image encoder and is configured to convert the sparse segmentation of the at least one target object into at least one recovered segmented target object indicative of the at least one target object.

The remote image segmentation system further includes a feature, wherein the at least one recovered segmented target object is an approximation of the at least one target object included in the raw image.

The remote image segmentation system further includes a feature, wherein the image encoder generates the masked image according to a random mask and the image decoder generates the at least one recovered segmented target object according to the random mask.

The remote image segmentation system further includes a feature, wherein the CNN applies a label to pixels included in the masked image to produce the masked segmented image, and wherein the image decoder generates the at least one recovered segmented target object based on the label applied to the pixels.

The remote image segmentation system further includes a feature, wherein the at least one target object includes a first type of target object and a second type of target object different from the first type of target object, and wherein the CNN applies a first label to the pixels associated with the first type of target object and applies a second label to the pixels associated with the second type of target object different from the first label.

The remote image segmentation system further includes a feature, wherein the image decoder prioritizes decoding of the pixels associated with the first label over the pixels associated with the different second label.

The remote image segmentation system further includes a feature, wherein the image decoder applies a matrix completion algorithm to the sparse segmentation of the at least one target object to generate the at least one recovered segmented target object.

According to yet another non-limiting embodiment, a method of exchanging data with a vehicle is provided. The method comprises capturing, via a sensor included on the vehicle, a raw image having a first image volume and including at least one target object and generating, via an image encoder included on a vehicle, a masked image having a second image volume that is less than the first image volume. The method further comprises delivering the masked image to a convolution neural network (CNN) located remotely from the vehicle, determining, via the CNN, the at least one target object from the masked image and generating a masked segmented image including a sparse segmentation of the at least one target object. The method further comprises converting, via an image decoder located remotely from the vehicle, the sparse segmentation of the at least one target object into at least one recovered segmented target object indicative of the at least one target object.

The method further includes a feature, wherein the at least one recovered segmented target object is an approximation of a segmentation of the at least one target object based on the original raw data.

The method further comprises generating the masked image according to a random mask and generating the at least one recovered segmented target object according to the random mask.

The method further comprises applying, via the CNN, a label to pixels included in the masked image to produce the masked segmented image, and generating, via the image decoder, the at least one recovered segmented target object based on the masked segmented image.

The method further comprises applying, via the CNN, a first label to the pixels associated with a first type of target object and applying a different second label to the pixels associated with a second type of target object different from the first type of target object.

The method further comprises prioritizing decoding of the pixels associated with the first label over the pixels associated with the different second label.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
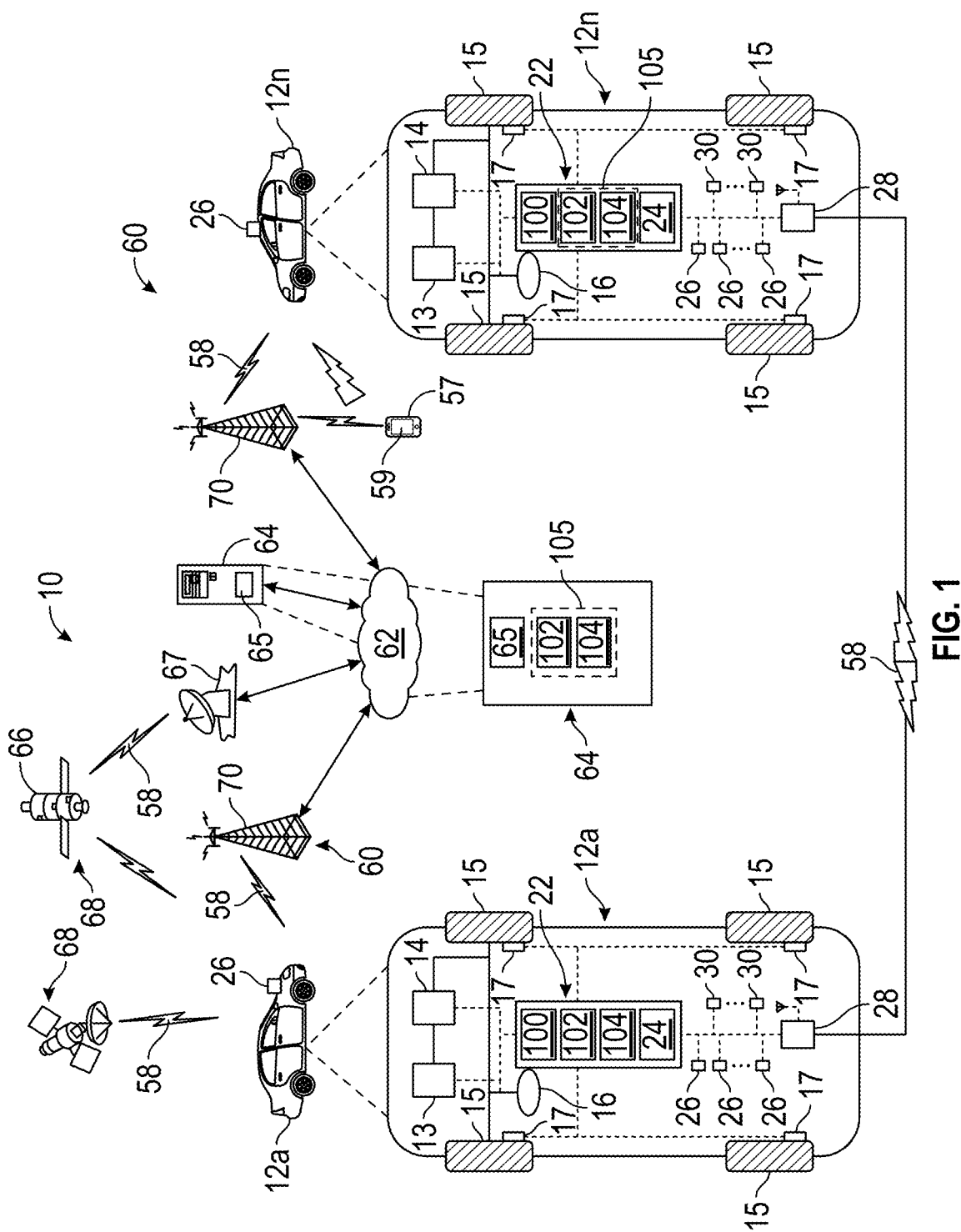
FIG. 1 is a schematic diagram of a vehicle communication and control system according to one or more embodiments.

The following description is merely exemplary in nature and is not intended to limit the present disclosure, its application or uses. It should be understood that throughout the drawings, corresponding reference numerals indicate like or corresponding parts and features.

As described herein, implementing image segmentation in a vehicle can allow for distinguishing different types of objects (vehicles, pedestrians, etc.) in captured raw image data. However, the capturing, processing and analysis of image data representing the environment (e.g., current traffic conditions) surrounding the vehicle presents challenges in terms of processing and exchanging such large amounts of data, and doing so in an expeditious, power efficient, and cost effective manner. In particular, sharing of the raw data captured by the vehicle's sensors requires high-compression rates. Therefore, performing image encoding and decoding using the vehicle's local computing system leads to significant loss in image quality, reduced image detection capability, and increased latency.

Various non-limiting embodiments described herein introduce a remote vehicle image segmentation system that requires reduced computational power to achieve reduced data exchange rates and latency metrics necessary to perform image segmentation on image data representing a vehicle's surrounding environment. The remote vehicle image segmentation system includes an image encoder, a light-weight convolution neural network (CNN), and an image decoder. The image encoder is employed locally in the vehicle computing system. However, the CNN and the image decoder are employed in a remotely located computing system such as, for example, a cloud computing system and/or a remotely located vehicle.

The vehicle can encode an originally captured high-resolution image (referred to herein as a "raw image"), which includes one or more target objects. The resulting encoded image is a low-volume masked image, which is then off-loaded from the vehicle and delivered to the remotely located CNN. A low-volume image as described herein refers to an image that includes a portion or reduced "set" of pixels compared to the total number of pixels included in the raw image. The reduced set of pixels are selected according to a randomized pixel mask that is programmed in the encoder and applied to the raw image to generate the masked image.

The CNN identifies one or more target objects from the masked image and generates a resulting masked image segmentation. The masked image segmentation includes one or more sparse segmentations of the target objects. The masked image segmentation is delivered to the image decoder, which applies a matrix completion algorithm to the sparse segmentations to recover a segmented image that represents one or more target objects included in the raw image. The low-volume of the encoded masked image not only requires low processing power compared to the processing power needed to process the raw image, but also allows for exchanging the masked image data with the remotely located computer system at low-latency.

FIG. 1 schematically illustrates an operating environment that comprises a vehicle communication and control system 10 for one or more vehicles 12a . . . 12n (collectively referred to as automotive vehicles 12a-12n). The communication and control system 10 for the vehicles 12a-12n generally includes one or more wireless carrier systems 60, a satellite communication system 68, a remote computing system 62, and/or a wireless device 57 including a display 59.

The vehicles 12a-12n, shown schematically in FIG. 1, include a propulsion system 13, which may in various embodiments include an internal combustion engine, an electric machine such as a traction motor, and/or a fuel cell propulsion system. Vehicles 12a-12n are depicted in the illustrated embodiment as a passenger car, but it should be appreciated that any other vehicle including motorcycles, trucks, sport utility vehicles (SUVs), recreational vehicles (RVs), self-driving vehicles, marine vessels, aircraft, etc., can also be used.

The vehicles 12a-12n also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicles 12a-12n additionally include wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicles 12a-12n additionally include a steering system 16. While depicted as including a steering wheel for illustrative purposes, in some embodiments contemplated within the scope of the present disclosure, the steering system 16 may not include a steering wheel.

The vehicles 12a-12n include a wireless communications system 28 configured to wirelessly communicate 58 with other vehicles ("V2V") a private infrastructure ("V2I"), or a public network ("V2N"). In an exemplary embodiment, the wireless communication system 28 is configured to communicate via a wireless local area network (WLAN) using IEEE 802.11 standards or by using cellular data communication. V2V, V2I and/or V2N data communication can also be facilitated using various wireless communication protocols including, but not limited to, dedicated short-range communications (DSRC) such as Institute of Electrical and Electronics Engineers (IEEE) protocol 802.11p and/or cellular V2X (C-V2X), which is based on the long-term evolution (LTE) wireless broadband standard.

The propulsion system 13, transmission 14, steering system 16, and wheel brakes 17 are in communication with or under the control of at least one vehicle controller 22. While depicted as a single unit for illustrative purposes, the vehicle controller 22 may additionally include one or more other controllers, collectively referred to as a "controller." The vehicle controller 22 may include a microprocessor such as a central processing unit (CPU) or graphics processing unit (GPU) in communication with various types of computer readable storage devices or media. Computer readable storage devices or media may include various types of memory such as, for example, volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the vehicle controller 22 in controlling a respective vehicle 12a-12n.

The vehicle controller 22 includes an automated driving system (ADS) 24 for automatically controlling various actuators in the vehicle 12a-12n. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from one or more sensors 26. The sensors 26 can include, but are not limited to, GPS, RADAR, LIDAR, optical cameras, thermal cameras, ultrasonic sensors, and/or additional sensors as appropriate.

The vehicle controller 22 further includes an image encoder 100. The image encoder 100 is configured to convert a high-resolution raw image captured by one or more of the sensors 26 into a masked image. When generating the masked image, the image encoder 100 takes only the values of a predefined small set of pixels from the original raw image. This predefined set is determined according to a random pixel mask applied by the encoder. The pixels excluded from the predefined set are discarded such that the resulting masked image is of considerably lower volume (i.e., considerably less pixels) as compared to the original raw image.

The time series encoding operation includes generating a time series with various data points that correspond to a masked image, thereby resulting in a low-volume random-pixelized masked image. Accordingly, the masked image can be exchanged via wireless communication 58 at substantially lower bandwidth and at substantially lower latency compared to the large bandwidth and high latency results that occur when wirelessly communicating non-encoded images or even fully encoded images with very low distortion (standard compression algorithms that restore the entire original raw image).

In one or more embodiments, the masked image can be off-loaded from the vehicle 12a-12n, via the wireless communication system 28, and delivered to the remote computing system 62 and/or a remotely located vehicle 12n where it is further processed by a convolutional neural network (CNN) 102 and the image decoder 104. In one or more non-limiting embodiments, the CNN 102 and the image decoder 104 can be integrated together as a single segmentation unit 105 that is located remotely from the vehicle that captured the original raw image. For example, the segmentation unit 105 including the CNN 102 and the image decoder 104 can be located in the remote computing system 62 and/or a remotely located second vehicle 12n. Accordingly, the image encoder 100, CNN 102, and image decoder 104 effectively operate together as a remote image segmentation system, which is discussed in greater detail herein.

The wireless carrier system 60 is preferably a cellular telephone system that includes one or more cell towers 70 as well as any other networking components required to connect the wireless carrier system 60 with the remote computing system 62. Each cell tower 70 includes sending and receiving antennas and a base station. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, wireless communication 58 in the form of satellite communication 68 can be used to provide uni-directional or bi-directional communication with the vehicles 12a-12n. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicles 12a-12n and the station uplink transmitting 67. The satellite telephony can be utilized either in addition to or in lieu of the wireless carrier system 60.

The remote computing system 62 is in signal communication with the wireless carrier system 60, the satellite communication system 68, and/or the vehicles 12a-12n. In one or more non-limiting embodiments, the remote computing system 62 is implemented using an edge computing infrastructure and/or a cloud computing infrastructure, either of which is located remotely from the vehicles 12a-12n.

The remote computing system 62 includes one or more networked computer servers 64. The network computer servers 64 include one or more server controllers 65. The server controller 65 includes memory and a processor configured to execute algorithms and computer-readable program instructions stored in the memory.

The computer servers 64 can be accessible via a private or public network such as the Internet allowing them to facilitate Internet connectivity via a DNS server or other network address server that uses DHCP or other suitable protocol to assign an IP address to a vehicle 12a-12n. In an exemplary embodiment, the computer servers 64 can be configured as a web server accessible by a vehicle 12a-12n via data exchange between vehicle's wireless communication system 28 and the wireless carrier 60.

The computer servers 64 can process various data including, but not limited to, diagnostic information and other vehicle data. The vehicle data can be provided by the vehicle 12a-12n via the wireless communication system 28. The computer servers 64 can also maintain a searchable database. Accordingly, the computer servers 64 can operate as a database management system that permits entry, removal, and modification of data as well as the receipt of requests to locate data within the database.

As described herein, the remote computing system 62 and/or a remotely located vehicle 12n can include a CNN 102 and an image decoder 104. The CNN 102 and image decoder 104 operate together with the image encoder 100 to provide a remote image segmentation system. Unlike conventional image segmentation systems, the remote image segmentation system described herein facilitates image segmentation that overcomes limited computational resources, high-bandwidth costs and low-latency constraints traditionally experienced in vehicle-to-vehicle (V2V) architectures, vehicle-to-infrastructure (V2I) architectures, and/or vehicle-to-network (V2N) architectures.

More specifically, the CNN 102 is trained (e.g., off-line) using a set or "pairs" of pre-defined masked images and their corresponding segmented masked images, typically referred to as the "ground-truth". In one or more non-limiting embodiments, a set of 50,000 modeled masked images, for example, can be employed to train the CNN 102. Once trained, the CNN 102 can receive the low-volume masked image provided by the image encoder 100, identify one or more target objects included in the low-volume masked image, and automatically construct a segmented masked image. In one or more non-limiting embodiments, the CNN 102 assigns a unique label to each pixel in the masked image associated with a target object. In this manner, individual segmented target objects can be defined based on the label assigned to their respective pixels.

The image decoder 104 receives the masked segmentation image and applies a matrix completion algorithm that reconstructs each target object to produce a recovered segmented image that represents the target objects included in the raw image. The recovered segmented image is an image including segmented target objects that are an approximation of the target objects included in the raw image captured by the vehicle 12a-12n. In one or more non-limiting embodiments, the decoder 104 performs a low-rank matrices operation (also referred to as a "low-rank approximation") based on the labeled pixels of the masked segmentation image to produce the recovered segmented image. For example, the decoder 104 can construct a zero-one matrix in which a value of "1" is assigned to labeled pixels and a value of "0" is assigned to all non-labeled pixels. The solution is a set of low-rank matrices having a size equal to the number of labels. Each low-rank matrix can be individually decoded by the decoder 104. The decoder 104 can then combine all the resulting completions to generate the recovered segmented image, which is an approximation of a segmentation of the raw image captured by the vehicle 12a-12n.

Figure 2:
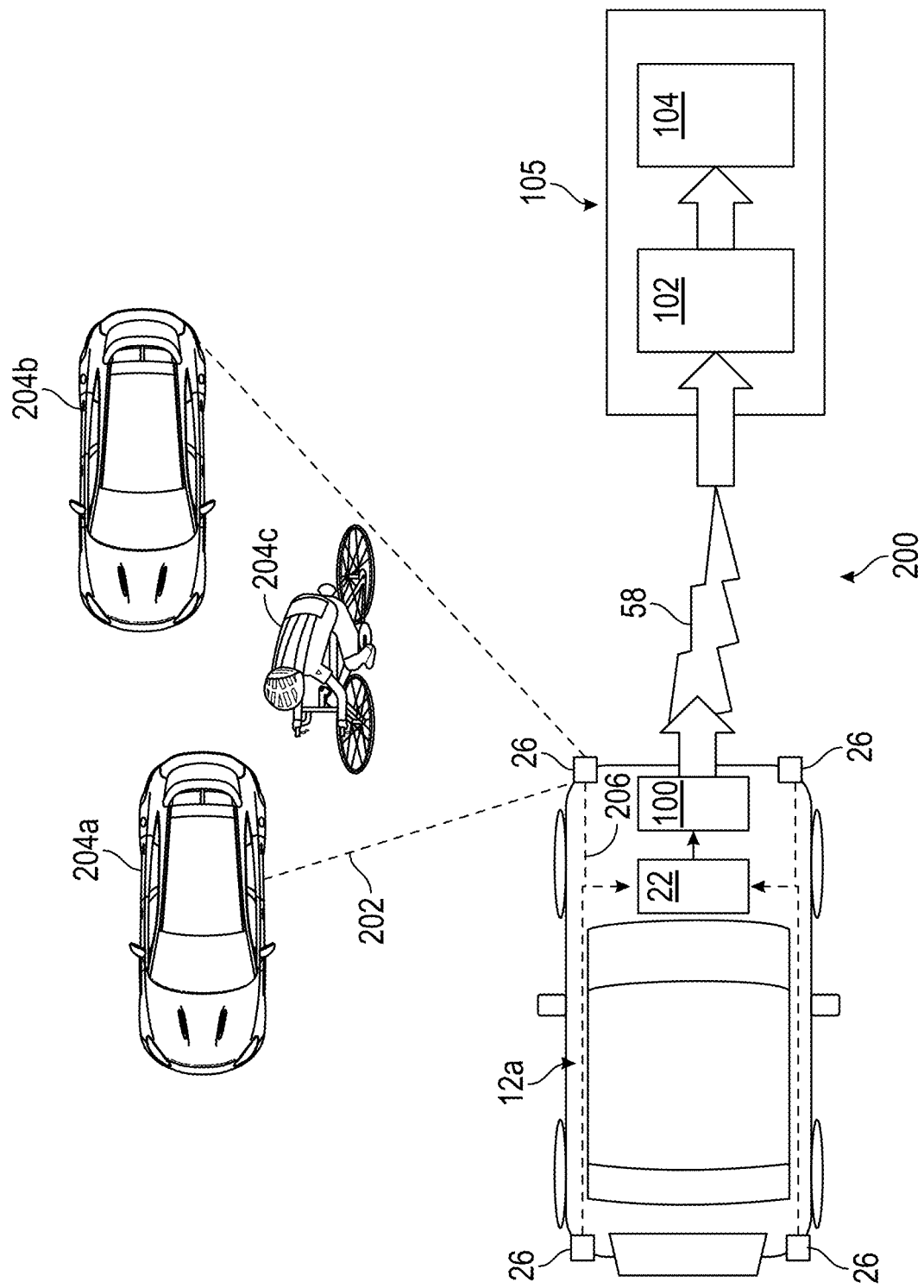
FIG. 2 depicts a remote image segmentation system according to one or more embodiments.

Turning now to FIG. 2, a remote image segmentation system 200 is illustrated according to a non-limiting embodiment. As described herein, the remote image segmentation system 200 includes an image encoder 100, a CNN 102 and an image decoder 104. The image encoder 100 is located in a first vehicle 12a, while the CNN 102 and image decoder 104 is included in a segmentation unit 105 that can be located in a remote computing system 62 and/or a second vehicle 12n. Data exchange between the image encoder 100 of the first vehicle 12a and the segmentation unit 105 is facilitated via wireless communication 58.

The image encoder 100 can be constructed as an electronic hardware controller that includes memory and a processor configured to execute encoding algorithms, image segmentation algorithms, and other computer-readable program instructions stored in the memory. Alternatively, the image encoder 100 can be implemented in the vehicle controller 22 as an integrated controller or integrated CPU.

The image encoder 100 is in signal communication with one or more vehicle sensors 26. The sensors 26 are configured to capture an original image or series of image frames appearing in a respective sensor's field of view (FOV) 202. In this example, the sensor's FOV 202 captures target objects 204a, 204b, and 204c. Target objects 204a and 204b (collectively referred to as objects 204a-204b) are automotive vehicles, while target object 204c is a pedestrian riding a bicycle, referred to herein as a "cyclist" 204c. The sensor 26 outputs the captured original image or image frames as a high-resolution digital image signal or "raw image" 300 (see FIG. 3), which is received by the vehicle controller 22 and delivered to the image encoder 100.

As described herein, the image encoder 100 converts the raw image 300 into a masked image 302 (see FIG. 3) having a reduced volume and data size. In one or more embodiments, the image encoder 100 sets a code rate and applies a random masking scheme that operates according to the set code rate. A random masking scheme refers to sampling a random scatter of pixels or data points rather than pixels or data points that are separated by one another by a fixed or specifically defined distance. The code rate also sets the size or rate at which to compress the raw image 300. For example, the image encoder 100 can set a code rate of 10 percent, which correlates to a compression ratio of 1:10.

The random masking scheme uses the set code rate to generate a random pixel mask based on a randomized mask seed that is used by both the image encoder 100 and image decoder 104 to perform their respective encoding and decoding operations. For a given code rate (R), the dimensions of the randomized mask seed can be set using the following equation:

$$R = k/n, \qquad \text{Eq. 1}$$

where (k) is a random portion of pixels to be sampled or included in the resulting masked image among a number (n) of pixels included in the raw image.

Once the random pixel mask is generated, it can be programmed in the image encoder 100 and the image decoder 104 prior to implementation in the vehicles 12a-12n and remote computing system 62. This allows the image encoder 100 and the image decoder 104 to each determine the location of the sampled pixels defined by the random pixel mask. In this manner, the image encoder 100 and the image decoder 104 can be "matched" to one another.

Once the masked image 302 is generated, it can be off-loaded from the vehicle 12a and delivered (e.g., wirelessly 58) to the segmentation unit 105. The CNN 102 and the image decoder 104 included in the segmentation unit 105 can each be constructed as an electronic hardware controller that includes memory and a processor configured to execute image segmentation algorithms, machine learning and artificial intelligence (AI) algorithms, image decoding algorithms, and other computer-readable program instructions stored in their respective memory.

As described herein, the CNN 102 is initially trained off-line using a set of ground-truth pairs of masked images and their corresponding segmented masked images. These ground-truth pairs are also generated according to the common random pixel mask described herein. Accordingly, the CNN 102 is trained to specifically learn and recognize the pixels set by the random mask and associated with different types of target objects that may be present in raw images captured by a first vehicle 12a. The target objects can include, but are not limited to, an automotive vehicle, a motorcycle, a truck, a cyclist, a pedestrian, animals, construction equipment, etc. In addition, the CNN 102 described herein is considered "light-weight" because it is not required to learn, recognize and process the full-resolution associated with target objects in the raw image, but rather produce a segmented masked image having significantly lower volume compared to the raw image. As a result, the both the training time of the CNN 102 and the overall computing power required to process the masked image 302 are reduced.

Figure 3:
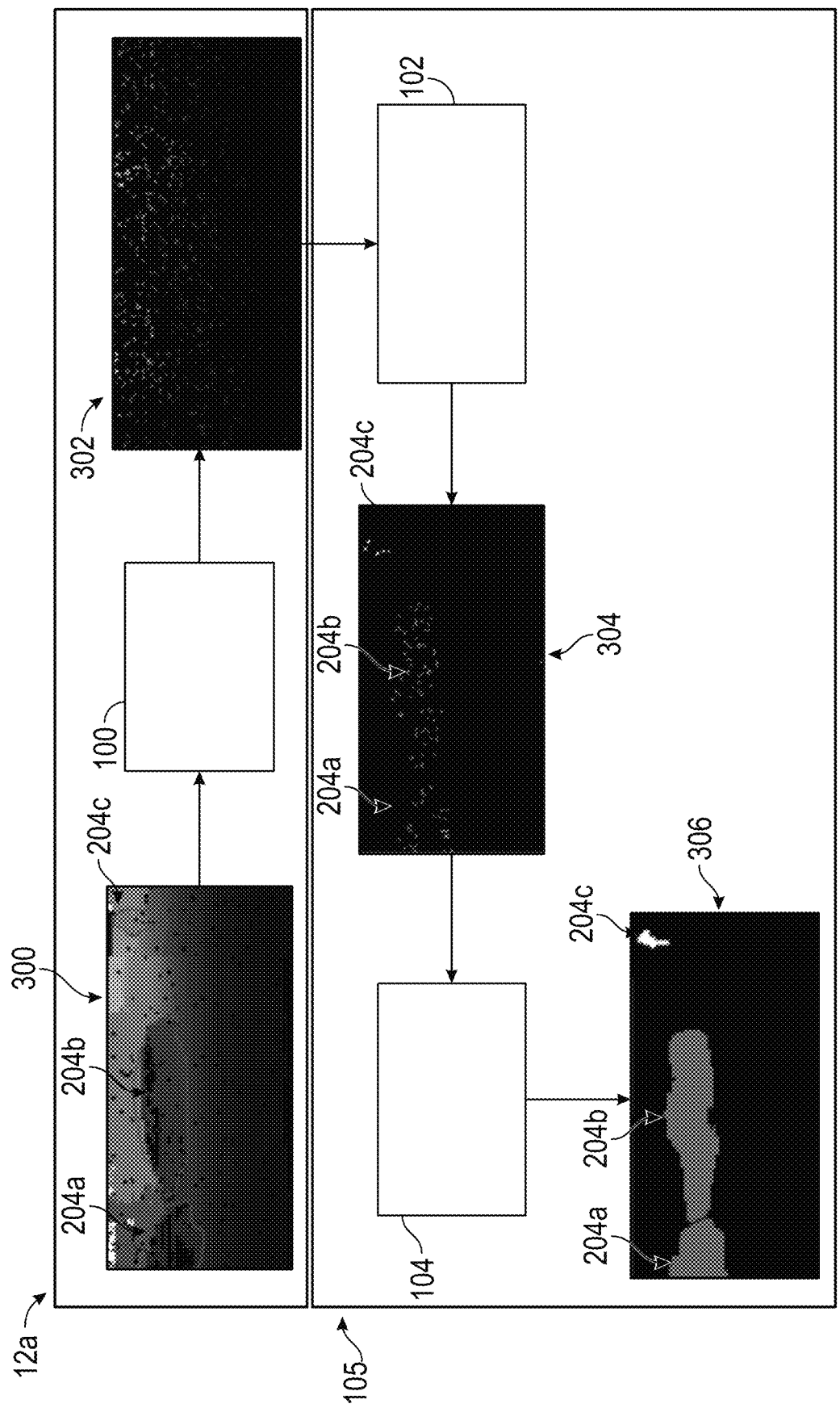
FIG. 3 depicts a process of generating a recovered segmented image based on raw image data captured by a vehicle according to one or more embodiments.

Once trained, the CNN 102 is placed "on-line" and is configured to receive the masked image 302 generated by the image encoder 100. The CNN 102 is configured to generate unique labels that correspond to pixels of the masked image that are associated with a given target object 204a, 204b, 204c, while excluding pixels disassociated with the target objects 204a, 204b, 204c. In one or more non-limiting embodiments, each unique label includes a unique color. For instance, pixels associated with automotive vehicles can be converted into red pixels, pixels associated with cyclists can be converted into white pixels, pixels associated with pedestrians can be converted into green pixels, etc. Accordingly, the CNN 102 analyzes the masked image 302, recognizes the pixels associated with the target objects 204a, 204b, and 204c based on its training, and applies a given label to each pixel associated with a target object included in the masked image 302. Referring to FIGS. 2 and 3, for example, a first label (e.g., a red pixel) can be applied to each pixel associated with the captured automobiles 204a and 204b, while a second label (e.g., a white pixel) can be applied to each pixel associated with the captured cyclist 204c.

The CNN 102 generates a masked segmented image 304 (see FIG. 3) that includes only a portion or subset of pixels compared to the pixels included the masked image 302. Accordingly, the masked segmented image 304 provides sparse segmentations of the target objects 204a, 204b, and 204c included in the raw image 300. As described herein, the CNN 102 can apply unique labels to pixels associated with different types of target objects 204a, 204b and 204c. In this manner, the image decoder 104 can prioritize decoding of the sparse segmented target objects 204a, 204b, and 204c as discussed in greater detail herein.

The image decoder 104 receives the masked segmented image 304 and applies a matrix completion algorithm to the masked segmented image 304 to generate a recovered segmented image 306 (see FIG. 3). The matrix completion algorithm operates on each label separately and essentially adds additional pixels or data points beyond those in the segmented masked image 304 associated with a respective label. Accordingly, the recovered segmented image 306 provides an approximation of the segmentation performed directly on the original raw image data and includes segmented target objects 204a, 204b and 204c that are approximations of the target objects 204a, 204b and 204c included in the raw image 300 originally captured by the vehicle 12a.

In one or more non-limiting embodiments, the image decoder 104 can be programmed to prioritize decoding of the target objects 204a, 204b, and 204c based on the label (e.g., color) of the pixels. For example, pixels applied with the label (e.g., white pixels) corresponding to the cyclist target object 204c can be determined to have a higher priority than the label (e.g., green pixels) corresponding to the vehicle target objects 204a and 204b. Based on the priority, the image decoder 104 can choose to decode target object pixels having a higher priority compared to target object pixels having lower priorities.

Although the recovered segmented image 306 is an approximation of the segmentation compared to a segmentation performed directly on the raw image 300, it can still be processed and analyzed by the server controller 65 and/or the vehicle controller 22 of a second vehicle 12n (see FIG. 1). The processed data can provide a wide-variety of information including, but not limited to, current traffic conditions, the location of objects in relation not only to the vehicle 12a that captured the raw image 300, but also to other vehicles 12n near the image capturing vehicle 12a, and locations of construction zones.

The processed data can also facilitate a "see through" feature that allows a trailing vehicle to "see through" a leading vehicle that has captured the raw image. For example, image segmentation of a raw image captured by leading vehicle 12a can be decoded in the remote computing system (e.g., a cloud computing system 62) to determine one or more objects 204a, 204b and 204c located in front of the leading vehicle 12a. The server controller 65 can then determine the distance between the objects 204a, 204b and 204c and the leading vehicle 12a and alert the trailing vehicle 12n of a possible stopping event without the trailing vehicle 12n being visually aware of the objects 204a, 204b and 204c.

Figure 4:
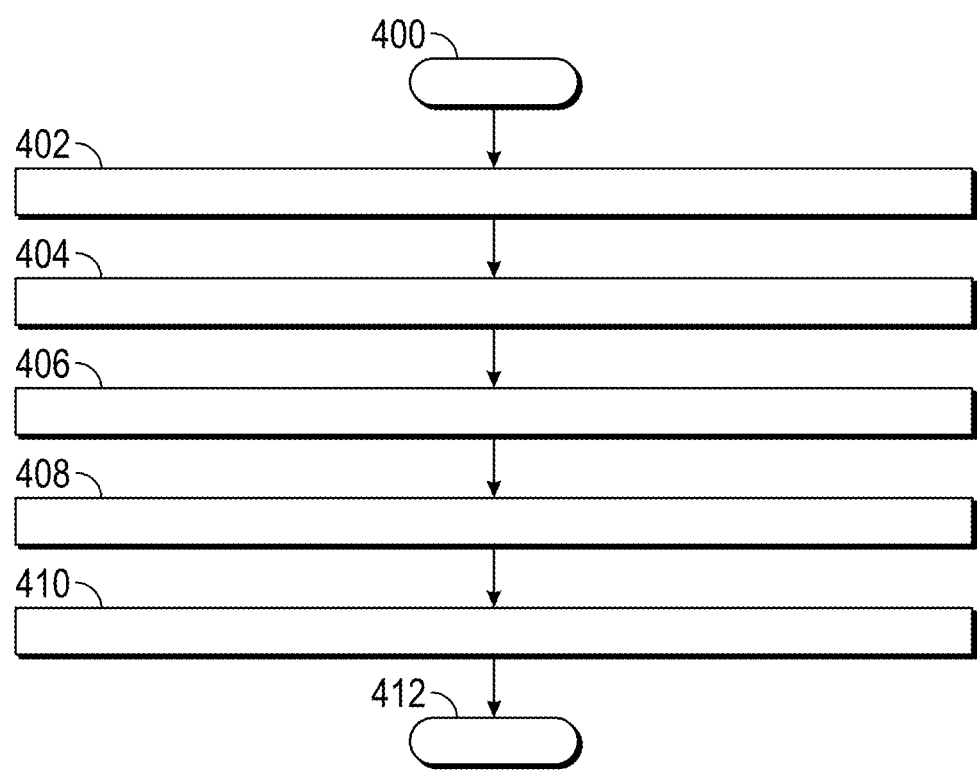
FIG. 4 is a flow diagram illustrating a method of exchanging data captured by a vehicle according to one or more embodiments.

With reference now to FIG. 4, a flow diagram illustrates a method of exchanging data captured by a vehicle according to one or more non-limiting embodiments. The method begins at operation 400, and at operation 402 a first vehicle 12a captures a raw image 300 including one or more target objects 204a, 204b and 204c. The raw image 300 can be captured using one or more sensors 26 (e.g., cameras) installed on the first vehicle 12a. At operation 404, an image encoder 100 installed on the first vehicle 12a converts the raw image 300 into a masked image 302. At operation 406, the masked image 302 is off-loaded from the first vehicle 12a to a CNN 102. The CNN 102 can be located in a remote computing system 62 (e.g., a cloud computing network) and/or a second vehicle 12n located remotely from the first vehicle 12a. At operation 408, the CNN 102 generates a masked segmented image 304 based on the masked image 302. At operation 410, an image decoder 104 generates a recovered segmented image 306 based on the masked segmented image 304. The recovered segmented image 306 includes one or more segmented target objects 204a, 204b, 204c that are approximations of the target objects 204a, 204b, 204c included in the raw image 300. Accordingly, the method ends at operation 412.

Various embodiments are described herein with reference to the related drawings. Alternative embodiments can be devised without departing from the scope of the inventive teachings. Various connections and positional relationships (e.g., over, below, adjacent, etc.) are set forth between elements in the following description and in the drawings. These connections and/or positional relationships, unless specified otherwise, can be direct or indirect, and the embodiments described herein are not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, (i.e., one, two, three, four, etc.). The terms "a plurality" may be understood to include any integer number greater than or equal to two (i.e., two, three, four, five, etc.). The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the embodiments may or may not be described in detail herein. In particular, various aspects of computing systems, algorithms, and specific computer programs to implement the various technical features described herein are well known. Accordingly, in the interest of brevity, many conventional implementation details are only mentioned briefly herein or are omitted entirely without providing the well-known system and/or process details.

The present embodiments include a system, a method, and/or a computer program product at any possible technical detail level of integration. The computer program product may include a computer readable storage medium (or media) having computer readable program instructions thereon for causing a processor to carry out aspects of the present teachings.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present teachings.

Aspects of the present teachings are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A vehicle communication and control system, comprising:
    a first vehicle in signal communication with one or both of a remote computing system and a second vehicle, the first vehicle including a sensor configured to capture a raw image having a first image volume and including at least one target object;
    an image encoder included in the first vehicle and configured to convert the raw image into a masked image having a second image volume that is less than the first image volume; and
    a segmentation unit included in one or both of the remote computing system and the second vehicle, the segmentation unit configured to determine the at least one target object from the masked image, to generate a masked segmented image including a sparse segmentation being a subset of pixels of the masked image indicative of the at least one target object, and to convert the sparse segmentation of the at least one target object into at least one recovered segmented target object indicative of the at least one target object.

2. The system of claim 1, wherein the segmentation unit comprises:
    a convolution neural network (CNN) configured to generate the sparse segmentation of the at least one target object by applying a label to the pixels associated with the at least one target object and excluding pixels disassociated with the at least one target object; and
    an image decoder configured to generate the at least one recovered segmented target object based on the label applied to the pixels.

3. The system of claim 2, wherein the image encoder generates the masked image according to a random pixel mask and the image decoder generates the recovered segmented target object according to the random pixel mask.

4. The system of claim 3, wherein the at least one recovered segmented target object is an approximation of the at least one target object included in the raw image.

5. The system of claim 4, wherein the at least one target object includes a first type of target object and a second type of target object different from the first type of target object, wherein the CNN applies a first label to pixels associated with the first type of target object and applies a second label to pixels associated with the second type of target object different from the first label.

6. The system of claim 5, wherein the image decoder prioritizes decoding of the pixels associated with the first label over the pixels associated with the different second label.

7. The system of claim 2, wherein the image decoder applies a matrix completion algorithm to the sparse segmentation of the at least one target object to generate the recovered segmented target object.

8. A remote image segmentation system, comprising:
an image encoder included on a vehicle and configured to receive a raw image having a first image volume and including at least one target object, and to generate a masked image having a second image volume that is less than the first image volume;
a convolution neural network (CNN) located remotely from the image encoder, the CNN configured to determine the at least one target object from the masked image and to generate a masked segmented image including a sparse segmentation being a subset of pixels of the masked image indicative of the at least one target object; and
an image decoder remotely located from the image encoder and configured to convert the sparse segmentation of the at least one target object into at least one recovered segmented target object indicative of the at least one target object.

9. The remote image segmentation system of claim 8, wherein the at least one recovered segmented target object is an approximation of the at least one target object included in the raw image.

10. The remote image segmentation system of claim 8, wherein the image encoder generates the masked image according to a random mask and the image decoder generates the at least one recovered segmented target object according to the random mask.

11. The remote image segmentation system of claim 8, wherein the CNN applies a label to the pixels included in the masked image to produce the masked segmented image, and wherein the image decoder generates the at least one recovered segmented target object based on the label applied to the pixels.

12. The remote image segmentation system of claim 11, wherein the at least one target object includes a first type of target object and a second type of target object different from the first type of target object, wherein the CNN applies a first label to the pixels associated with the first type of target object and applies a second label to the pixels associated with the second type of target object different from the first label.

13. The remote image segmentation system of claim 12, wherein the image decoder prioritizes decoding of the pixels associated with the first label over the pixels associated with the different second label.

14. The remote image segmentation system of claim 8, wherein the image decoder applies a matrix completion algorithm to the sparse segmentation of the at least one target object to generate the at least one recovered segmented target object.

15. A method of exchanging data with a vehicle, the method comprising:
capturing, via a sensor included on the vehicle, a raw image having a first image volume and including at least one target object;
generating, via an image encoder included on the vehicle, a masked image having a second image volume that is less than the first image volume;
delivering the masked image to a convolution neural network (CNN) located remotely from the vehicle;
determining, via the CNN, the at least one target object from the masked image generating a masked segmented image including a sparse segmentation being a subset of pixels of the masked image indicative of the at least one target object; and
converting, via an image decoder located remotely from the vehicle, the sparse segmentation of the at least one target object into at least one recovered segmented target object indicative of the at least one target object.

16. The method of claim 15, wherein the at least one recovered segmented target object is an approximation of a segmentation of the at least one target object based on the original raw data.

17. The method of claim 15, further comprising generating the masked image according to a random mask and generating the at least one recovered segmented target object according to the random mask.

18. The method of claim 15, further comprising:
applying, via the CNN, a label to the pixels included in the masked image to produce the masked segmented image; and
generating, via the image decoder, the at least one recovered segmented target object based on the masked segmented image.

19. The method of claim 18, further comprising applying, via the CNN, a first label to pixels associated with a first type of target object and applying a different second label to pixels associated with a second type of target object different from the first type of target object.

20. The method of claim 19, further comprising prioritizing decoding of the pixels associated with the first label over the pixels associated with the different second label.

* * * * *